United States Patent [19]

Chan

[11] Patent Number: 6,030,225
[45] Date of Patent: Feb. 29, 2000

[54] RAISED CHARACTER DISPLAY STRUCTURE

[76] Inventor: Ying Kit Chan, 20 Lee Chung Street, 13th Floor, Chai Wan, The Hong Kong Special Administrative Region of the People's Republic of China

[21] Appl. No.: 09/244,521

[22] Filed: Feb. 4, 1999

[51] Int. Cl.[7] .................................................. G09B 1/00
[52] U.S. Cl. .......................... 434/159; 434/156; 434/170
[58] Field of Search ...................................... 434/159, 160, 434/161, 169, 171, 172, 167, 178

[56]   References Cited

U.S. PATENT DOCUMENTS

| | | | |
|---|---|---|---|
| 1,055,151 | 3/1913 | Emerson | 273/272 |
| 2,585,924 | 2/1952 | Freedman et al. | 273/282.2 |
| 3,016,243 | 1/1962 | Irwin | 273/272 |
| 3,805,416 | 4/1974 | Plefkey | 35/35 |
| 3,845,958 | 11/1974 | Reinertsen | 273/135 |
| 4,000,573 | 1/1977 | Cohen | 40/142 |
| 4,450,640 | 5/1984 | Shapiro et al. | 40/596 |
| 4,710,979 | 12/1987 | Bull et al. | 2/48 |
| 4,968,255 | 11/1990 | Lee et al. | 434/159 |
| 5,065,537 | 11/1991 | Bailey | 40/618 |
| 5,159,892 | 11/1992 | Hara et al. | 116/28.1 |
| 5,320,345 | 6/1994 | Lai et al. | 273/58 |
| 5,361,904 | 11/1994 | Kapec et al. | 206/460 |
| 5,404,444 | 4/1995 | Billings | 345/349 |
| 5,433,610 | 7/1995 | Godfrey et al. | 434/169 |
| 5,620,324 | 4/1997 | Rettke | 434/160 |
| 5,624,119 | 4/1997 | Leake | 273/269 |
| 5,716,212 | 2/1998 | Lee | 434/159 |

*Primary Examiner*—Robert A. Hafer
*Assistant Examiner*—Bera B. Mill
*Attorney, Agent, or Firm*—Cohen, Pontani, Lieberman & Pavane

[57]   ABSTRACT

A raised character display structure for an educational toy includes a label having a first character printed on one side thereof and a layer having a first and a second opposite side. The layer's second side has a projection defining a second character shaped substantially identical to the first character and made of a non-opaque material. The layer is disposed on the label with the first side of the layer adjacent to the one side of the label and with the second character substantially coincident with the first character on the label so that the first character may be viewed through the second character and that a user is provided with an illusion that the second character has the color and/or pattern of the printed first character.

14 Claims, 4 Drawing Sheets

RAISED CHARACTER DISPLAY STRUCTURE

BACKGROUND OF THE INVENTION

1. Field of the Invention

The present invention relates to character displays for educational toys and, more particularly, to a display structure having an embossed character.

2. Description of the Related Art

There are numerous educational toys for teaching children letters and numbers. For example, U.S. Pat. No. 4,968,255 to Lee et al. discloses an electronic interactive speech producing apparatus for instructing children in letters and numbers. The apparatus, constructed in the form of a school bus, has a plurality of input sockets arranged at each window position of the school bus and answer blocks having complementary input detection elements for engagement with the input sockets. Each answer block has a display face with an embossed number or a letter formed thereon. Insertion of the answer blocks triggers an audible presentation of the letter or number displayed thereon.

U.S. Pat. No. 3,845,958 to Reinertsen discloses another toy for teaching children letters and numbers. The toy has a tray and a plurality of disks. Each disk has an aperture patterned as a letter or number and the tray has a plurality of complementarily shaped protrusions for cooperation with the apertures in the disks.

SUMMARY OF THE INVENTION

An object of the present invention is to provide a low-cost and yet attractive character display structure for an educational toy.

Another object of the present invention is to provide a display structure for teaching a child letters, numbers or other characters.

In a presently preferred embodiment of the present invention, the raised character display structure for an educational toy includes a label having a first character displayed on one side thereof and a layer having a first and a second opposite side. The layer's second side has a projection defining a second character shaped substantially identical to the first character and made of a non-opaque material. The layer is disposed on the label with the first side of the layer adjacent to the one side of the label and with the second character substantially coincident with the first character on the label such that the first character may be viewed through the second character and that a user is provided with an illusion that the second character has the visual characteristics of the first character.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
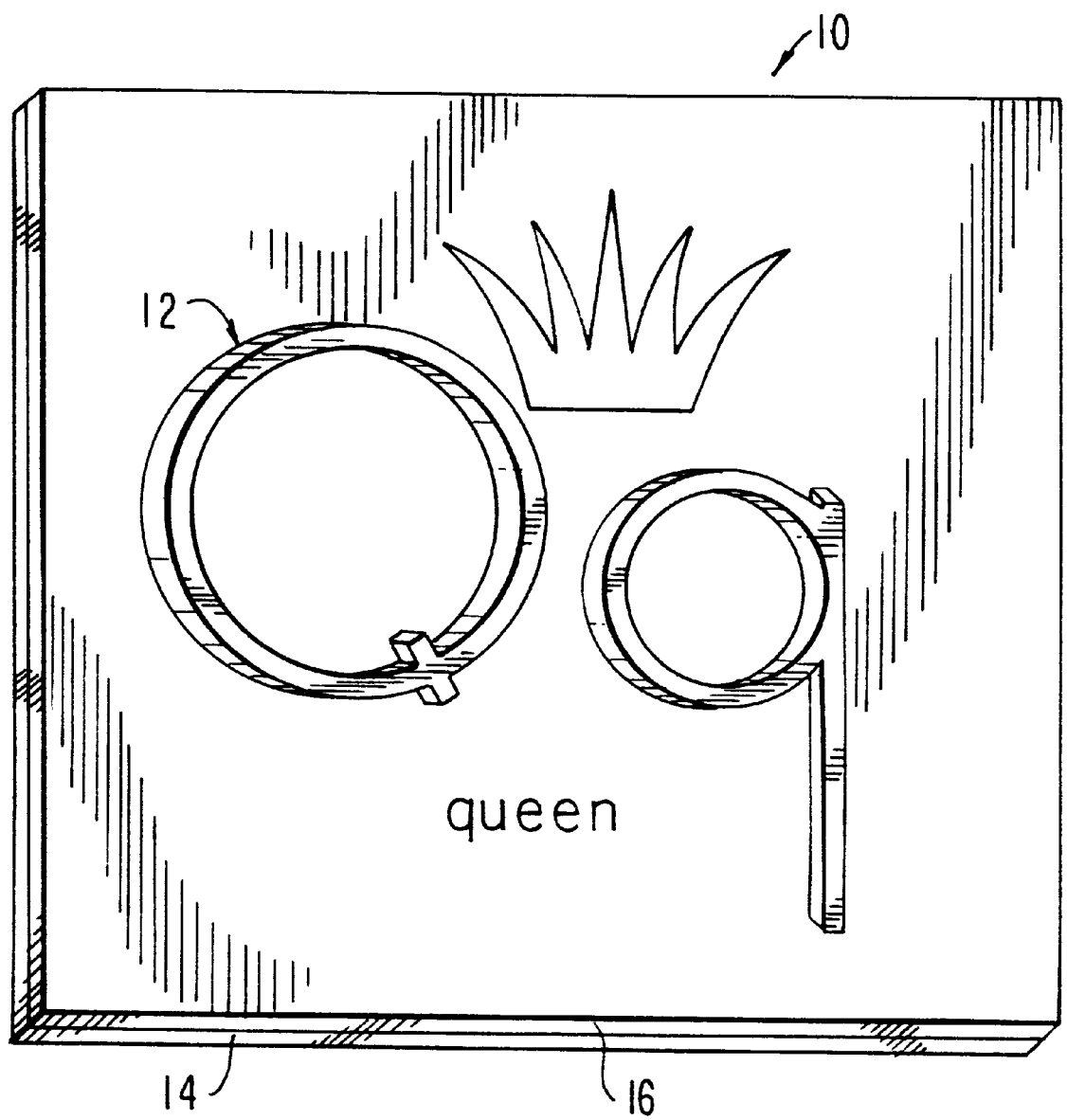
FIG. 1 illustrates a raised character structure constructed in accordance with an embodiment of the present invention.

Referring now to the drawings, FIG. 1 shows an embodiment of the raised character display structure 10 of the present invention. Although the embodiment of FIG. 1 depicts raised characters 12—an upper case letter "Q" and a lower case letter "q" —other raised characters may also be displayed such as, for example, Arabic numerals, Greek letters, Japanese characters, shapes or the like. It is also contemplated that instead of an alphabet, a two-letter phoneme may also be displayed.

Figure 2:
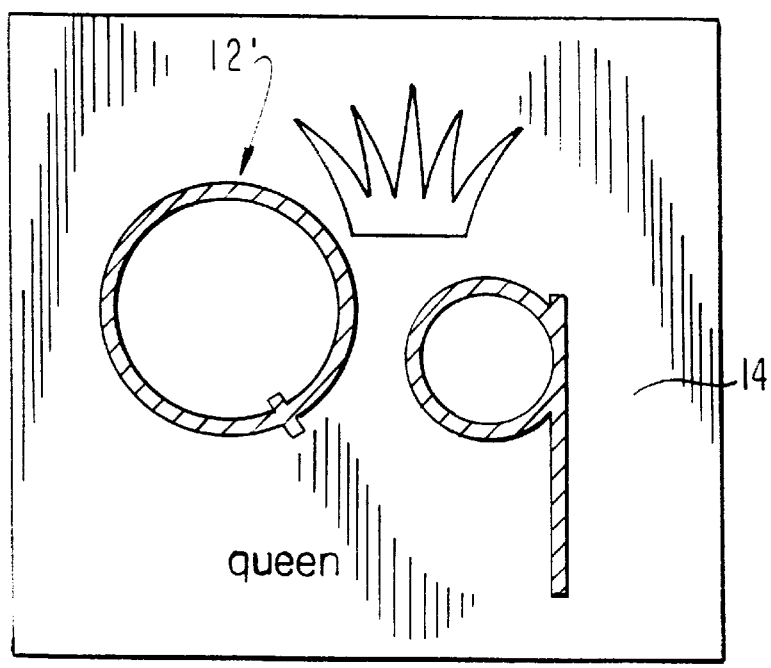
FIG. 2 depicts a label of the embodiment of FIG. 1.

As exemplarily illustrated, the structure includes a label 14 and a non-opaque layer 16 disposed in a stacked relationship. The label 14 has at least one character 12' printed or otherwise displayed thereon and the non-opaque layer 16 has an embossed character 12 of substantially the same shape as the character 12' on the label. The label is preferably a die cut label and has a pictograph illustrated on its display surface. As shown in FIG. 2, the pictograph includes an upper case letter "Q", a lower case letter "q," a word "queen," and an illustration of a queen's crown printed thereon. The pictograph is arranged so as to retain a child's attention and to enable the child to readily associate the letters "Q" and "q" with the word "queen." Preferably, the letters "Q" and "q" are printed in solid color but may alternatively be printed in a colorful pattern. Other forms of pictographs can be realized by persons of ordinary skill in the art from the disclosure herein.

Figure 3:
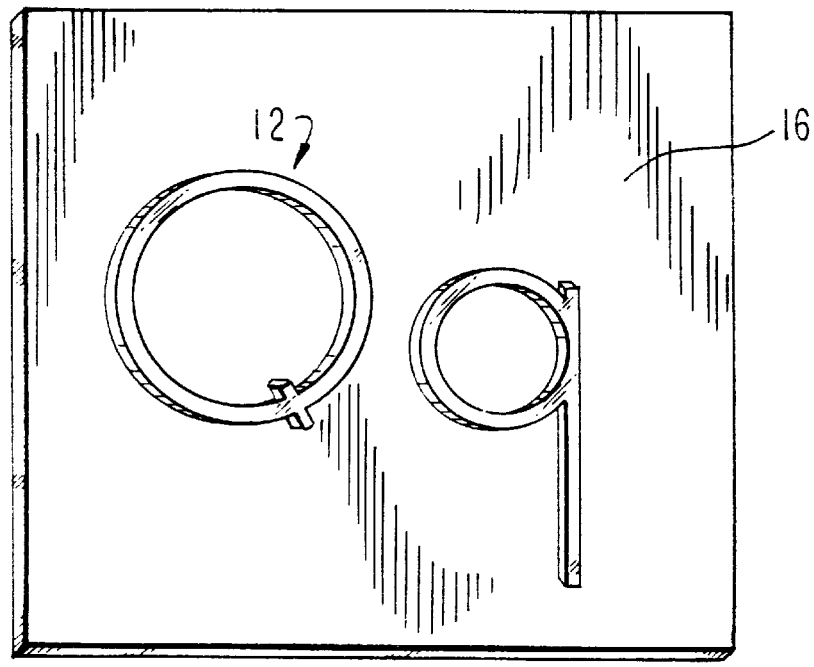
FIG. 3 depicts a non-opaque layer of the embodiment of FIG. 1.

FIG. 3 illustrates the non-opaque layer 16 of FIG. 1. The layer 16 has one or more raised characters protruding outwardly from one side of the layer. The raised character(s) 12 may be integrally formed with the layer 16 or, alternatively, separately made and subsequently assembled onto the non-opaque layer 16. Preferably, the dimension and shape of the raised character(s) 12 are substantially identical to the printed character(s) 12' on the label as, for example, shown in FIGS. 2 and 3. The raised character 12 or the entire layer 16 may be made of a non-opaque material. The non-opaque material may be transparent or translucent, colored or colorless and which preferably refracts light so as to provide the raised character 12 with a visual effect described below.

The structure 10 is constructed by aligning the raised character 12 of the layer 16 with the printed character 12' of the label 14 such that the outline of the raised character 12 substantially coincides or matches that of the printed character 12' of the label 14. When viewed substantially perpendicularly, the colored light reflecting from the printed character 12' is refracted by the raised character 12 so as to give the child the illusion that the raised character 12 has the visual characteristics such as, for example, color and/or pattern of the printed character 12'.

The inventive display structure has several advantages. For example, the visual effect created by the embossed character 12 will encourage a preschooler, who typically has a short attention span, to pay closer attention to the shape of the displayed character (e.g. a letter), thereby helping the child to learn more quickly. Also, the printed pictograph may include complex and varied pictorial elements without distracting the child because the display structure 10 provides an embossed character 12 having a unique three-dimensional visual effect which sets the character apart from the rest of the pictograph. Furthermore, the visual effect encourages the child to touch and feel the raised character thereby furthering the goal of familiarizing the child with the character.

Figure 4:
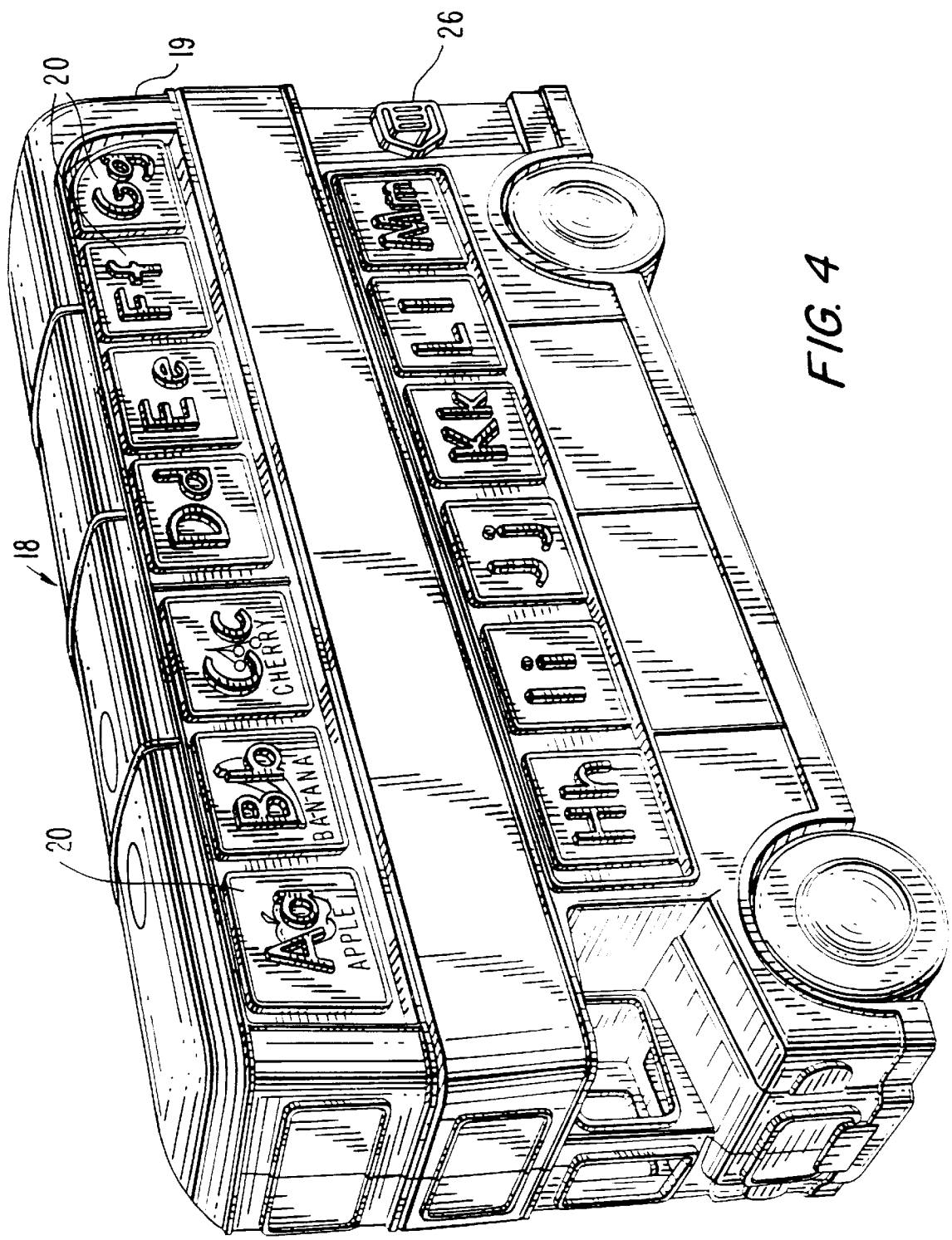
FIG. 4 illustrates a phonics teaching apparatus incorporating an embodiment of the raised character display structure of the present invention.
Figure 5:
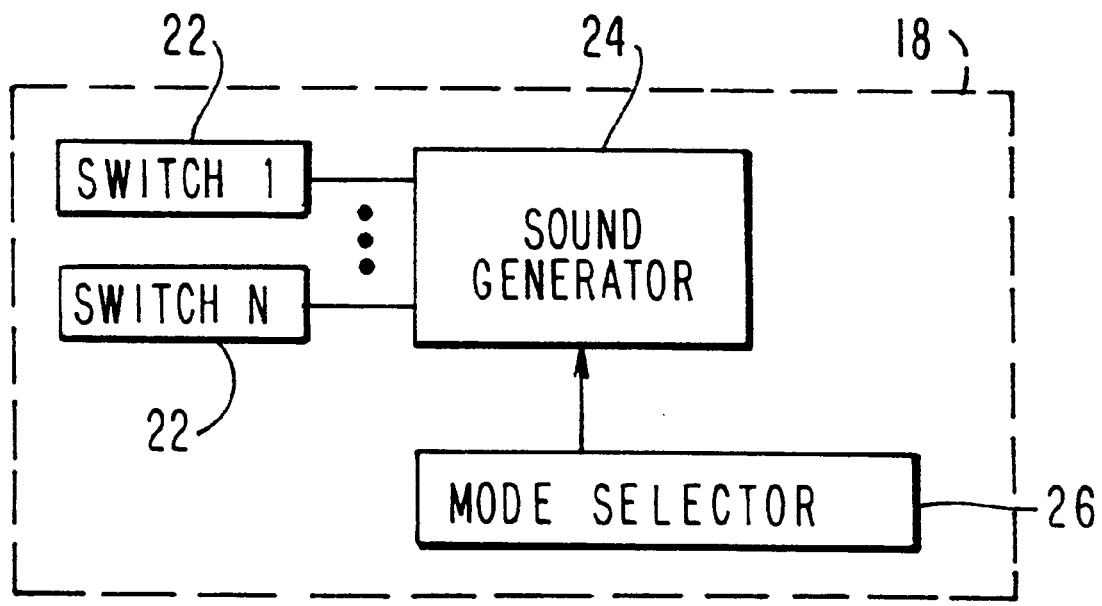
FIG. 5 is a functional block diagram of the phonics teaching apparatus of FIG. 4.

In one embodiment, the raised character display structure 10 may be advantageously employed as an attractive pushbutton for an electronic phonics teaching apparatus. For example, as shown in FIGS. 4 and 5, the phonics reading apparatus 18 has a housing 19 configured as a double decker bus wherein alphabets and pictorial elements are displayed on window-like pushbuttons 20 operatively connected to user-activatable switches 22. Disposed in the housing 19 is an art-recognized sound generator 24 which is activatable by the switches 22. The sound generator 24 has several modes of play associated with each letter, each corresponding to a different audio presentation such as, for example, phoneme, word(s), or music. The apparatus further includes a mode selector switch 26, which may be a slidably movable switch, for selecting a desired mode of play. In use, a child interested in learning the phoneme associated with a letter may move the mode selector switch 26 to the desired mode of play and then depress pushbutton 20 bearing the letter, whereupon the apparatus 18 provides an audible presentation of the letter.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve substantially the same results are within the scope of the invention. It is the intention, therefore, to be limited only as indicated by the scope of the claims appended hereto.

I claim:

1. A raised character display structure for a toy, comprising:
    a label having a first character displayed on one side thereof; and
    a layer having a first side and a second side opposite said first side, said second side having a projection extending outwardly from said second side and shaped substantially identical to said first character to thereby form a raised character, said raised character comprising non-opaque material such that light may travel therethrough, said layer being disposed on said label with said first side of said layer adjacent to said one side of said label and with said raised character substantially coincident and aligned with said first character on said label such that said first character may be viewed through said raised character and that a user is provided with an illusion that said raised character has visual characteristics of said first character.

2. The raised character display structure of claim 1, wherein said non-opaque material is translucent.

3. The raised character display structure of claim 1, wherein said non-opaque material is transparent.

4. The raised character display structure of claim 1, wherein said non-opaque material is colored.

5. The raised character display structure of claim 1, wherein said first character is a printed character and said label includes a printed pictorial element out of alignment with said projection.

6. The raised character display structure of claim 1, wherein said layer is translucent.

7. The raised character display structure of claim 1, wherein said layer is transparent.

8. The raised character display structure of claim 1, wherein said label is a die cut label.

9. An electronic teaching apparatus comprising:
    a raised-character display plate including:
        a label having a first character displayed on one side thereof; and
        a layer having a first side and a second side opposite said first side, said second side having a projection extending outwardly from said second side and shaped substantially identical to said first character to thereby form a raised character, said raised character comprising a non-opaque material such that light may travel therethrough, said layer being disposed on said label with said first side of said layer adjacent to said one side of said label and with said raised character substantially coincident and aligned with said first character on said label such that said first character may be viewed through said raised character and that a user is provided with an illusion that said raised character has visual characteristics of said first character;
    a sound generator for producing sounds corresponding to said first character; and
    user-manipulable switch connected to said raised-character display plate for activating said sound generator to produce sounds corresponding to said first character upon manipulation of said display plate.

10. The apparatus of claim 9, wherein said user-manipulable switch is a depressible switch.

11. The apparatus of claim 9, further comprising a housing configured as a double decker bus for housing said sound generator.

12. The apparatus of claim 9, wherein said non-opaque material is transparent.

13. The apparatus of claim 9, wherein said non-opaque material is transparent.

14. The apparatus of claim 9, wherein said sound generator has a plurality of modes of play associated with said first character, each of said plurality of modes corresponding to a different audio presentation, said apparatus further comprising a mode selector switch connected to said sound generator for activating a select one of said plurality of modes.

* * * * *